United States Patent [19]
Beyer et al.

[11] Patent Number: 5,821,493
[45] Date of Patent: Oct. 13, 1998

[54] HYBRID LASER AND ARC PROCESS FOR WELDING WORKPIECES

[75] Inventors: Eckhard Beyer, Roetgen-Rott; Ralf Imhoff, Aachen; Jan Neuenhahn, Braunschweig; Christof Maier, Aachen, all of Germany

[73] Assignee: Fraunhofer-Gesellschaft Zur Forderung Der Angewandten Forschung E.V., Munich, Germany

[21] Appl. No.: 817,410

[22] PCT Filed: Jul. 22, 1995

[86] PCT No.: PCT/DE95/00965

§ 371 Date: Jun. 5, 1997

§ 102(e) Date: Jun. 5, 1997

[87] PCT Pub. No.: WO96/09135

PCT Pub. Date: Mar. 28, 1996

[30] Foreign Application Priority Data

Sep. 23, 1994 [DE] Germany .......................... 44 34 125.3
Jan. 10, 1995 [DE] Germany ........................ 195 00 512.0

[51] Int. Cl.⁶ ............................. B23K 10/00; B23K 26/00
[52] U.S. Cl. ................................ 219/127.46; 219/121.59; 219/121.64; 219/121.45; 219/137 R

[58] Field of Search ........................ 219/121.45, 121.46, 219/121.59, 137 R, 137.2, 137.31, 121.63, 121.64

[56] References Cited

U.S. PATENT DOCUMENTS

| 4,390,774 | 6/1983 | Steen et al. ........................ 219/121.64 |
| 4,507,540 | 3/1985 | Hamasaki . |
| 4,782,205 | 11/1988 | Shira ......................................... 219/74 |
| 5,006,688 | 4/1991 | Cross . |
| 5,532,454 | 7/1996 | Kuhnen ............................... 219/137 R |
| 5,591,360 | 1/1997 | Mombo-Caristan ............... 219/121.64 |

FOREIGN PATENT DOCUMENTS 87 16 668.2  3/1988  Germany .

*Primary Examiner*—Mark H. Paschall
*Attorney, Agent, or Firm*—Herbert Dubno

[57] ABSTRACT

A welding process in which laser radiation is trained on the seam area formed between two sheet-metal workpieces, one of which has an edge projecting above the other. In addition, the arc is guided along this edge to melt the edge and contribute molten metal to the pool formed by the laser.

13 Claims, 8 Drawing Sheets

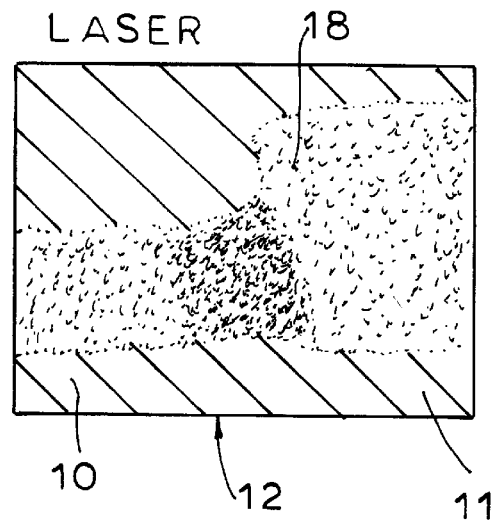
F I G. 4A
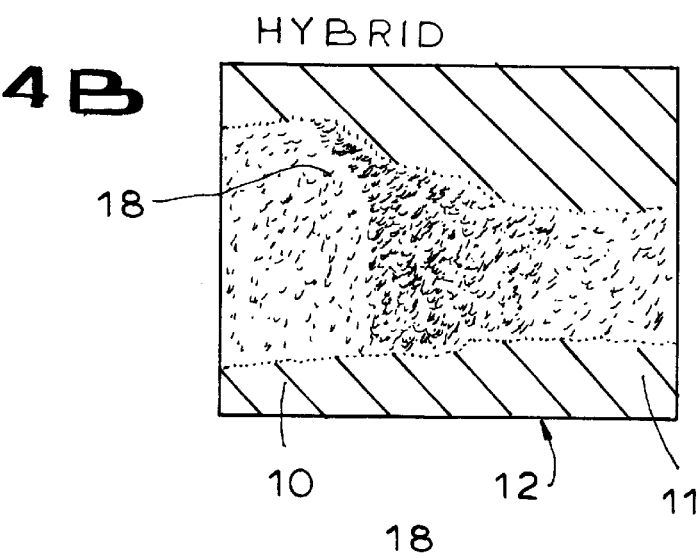
F I G. 4B
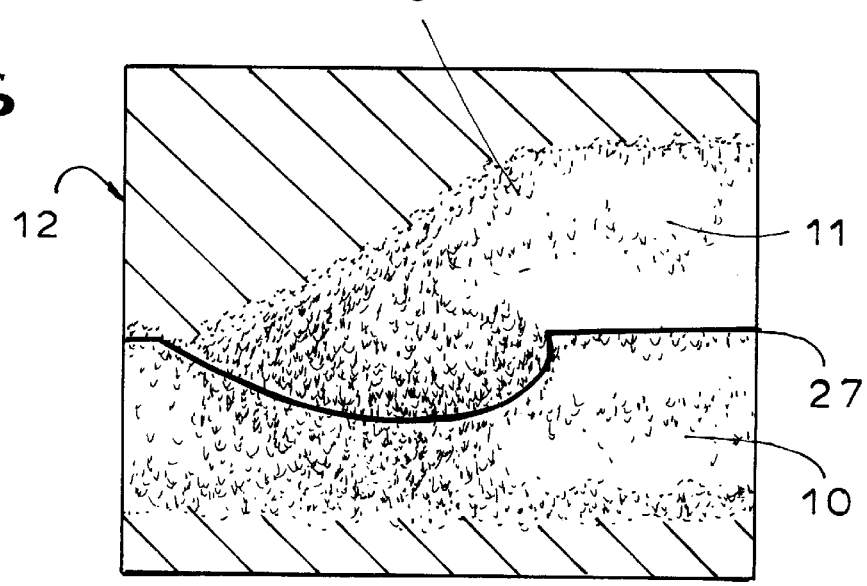
F I G. 6

WITHOUT WELDING

WITHOUT GAP

ZINC VAPOR

WITH GAP

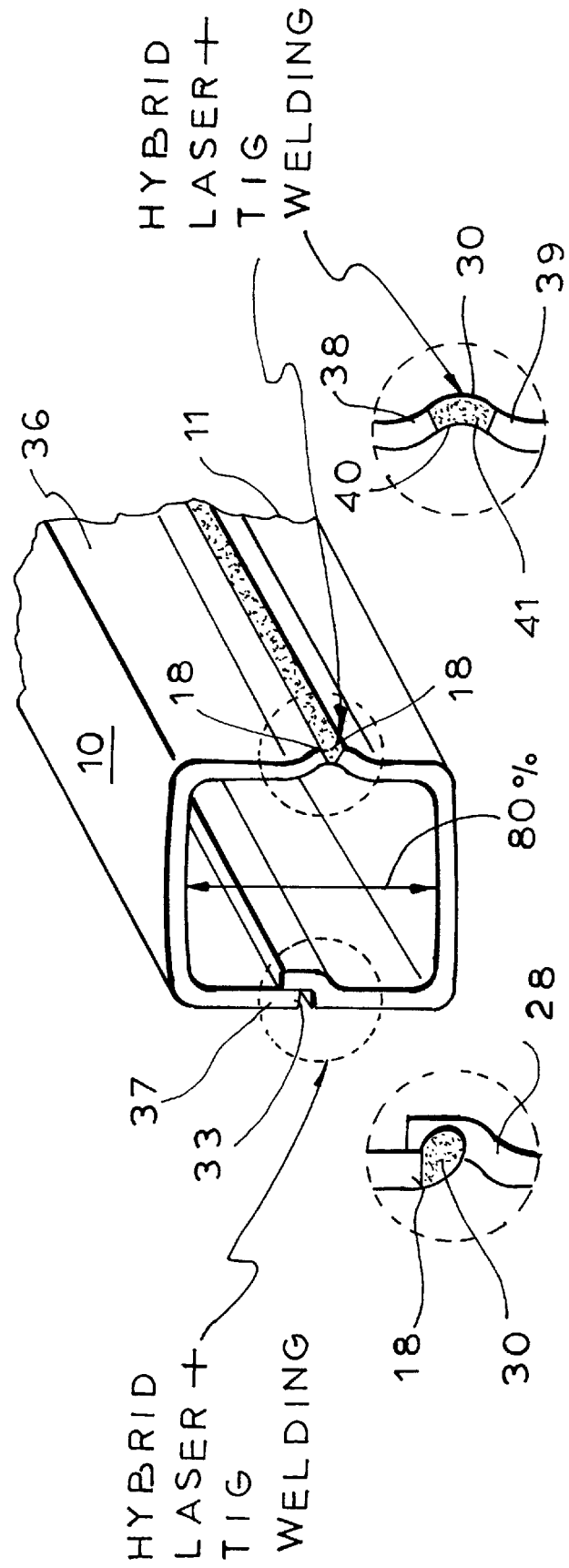

HYBRID LASER AND ARC PROCESS FOR WELDING WORKPIECES

CROSS REFERENCE TO RELATED APPLICATIONS

This application is a national stage of PCT/DE95/100965 which is based on German national applications P44 34 125.3 filed 23 Sep. 1994 and 195 00 512.0 filed 10 Jan. 1995 under the International Convention.

FIELD OF THE INVENTION

The invention relates to a process for welding workpieces with a laser radiation causing the vaporization of the material, wherein workpieces with angled surfaces and at least one edge, particularly tailored blanks or galvanized sheets, are placed in the weld seam area.

BACKGROUND OF THE INVENTION

Laser welding methods are used in the welding of sheet metal and of components made of sheet metal. Such components are known as tailored blanks and are for instance parts of a group of components for motor vehicle bodies. Strongly curved, tunnel-shaped pieces of sheet metal used for encasing the cardanic shaft of a motor vehicle with rear-wheel drive can be mentioned as a concrete example for tailored blanks. In order to achieve the desired high-grade welding of such tailored blanks, the respective sheet metal pieces have to undergo very precise weld seam preparations, as well as an accurate positioning for welding. Special steps are required for the positioning of the work head of the laser welding device, so that the laser beam can be effective where it is needed for producing a high-quality weld, without being disturbed by the projecting edge of the thicker component.

OBJECTS OF THE INVENTION

It is therefore the object of the invention to improve a process with the aforementioned process steps so that the efforts for the precise preparation of the weld seam during the production of the workpiece and during its positioning for welding can be eliminated, without any adverse effects on the quality of the weld.

SUMMARY OF THE INVENTION

This object is achieved due to the fact that during the welding of the workpiece, in addition to the laser beam, an arc is guided close to the workpiece in the process range of the laser beam, whereby the guidance of the arc takes place on the edge of a workpiece.

Since in the case of tailored blanks or workpieces with different thickness in the weld seam area, it is always difficult to achieve satisfactory results with only one means for supplying the welding energy, the main concept of the invention resides foremost in the fact that, in addition to the laser beam, welding energy is also supplied with an arc. The energy supplied by the arc serves for at least partially melting the projecting edge of the thicker workpiece, whereby the arc is essentially guided by the electrode with this projecting edge. The metal vapor or plasma generated by the laser radiation process, as well as the high field strength at the edge influence the arc in such a way that a stable melting of the free cutting edge and an incoming flow of melt in the weld zone of the sheet metal pieces take place also at high process speeds. Thereby this edge is melted off and rounded. The melted off material flows into the welding zone and in a gap possibly located there, which as a result is at least partially filled, respectively filled up. Particularly a collapse of the weld seam causing a notch effect in the workpiece is avoided. Generally a rounding of the weld zone or of the weld seam area, takes place. The melt flowing into the weld seam area makes it possible to allow for less precise preparation of the weld seam and for higher tolerances in the positioning precision of the workpieces to be welded together. The occurrence of errors is less frequent due to the larger volume of melt, so that the welding process is more reliable. In addition higher welding speeds become possible, because comparatively more energy is brought in due to the arc. Therefore the welding process becomes more cost-effective.

However the process of the invention is suitable not only for welding tailored blanks. It is rather suitable for all workpieces which have angular surfaces and at least one edge in area of the weld seam. In this case the guidance of the arc takes place at the edge of a workpiece and the possible gaps existing between the workpieces can be filled by the melting of the edge. All the advantages of hybrid welding can be realized: higher speeds, reduced power, higher efficiency, low operating costs, as well as the possibility to bridge even larger gaps.

The two angular surfaces and their at least one edge form a fillet weld arrangement, which can be advantageously used also in the welding of coated, particularly galvanized, workpieces.

In the case of tailored blanks the process is advantageously carried out so that two workpieces of different thickness are positioned and the arc is essentially guided along the projecting edge of the thicker workpiece. As a result only on one side of the butt joint is a workpiece projection is provided, by means of which the arc can be safely guided.

In a further development of the invention the process is performed so that a forerunning arc, a trailing arc or an arc running outside the trajectory of the laser beam, laterally therefrom approximately at the same level, is angularly positioned with respect to the thinner workpiece. The aforementioned main advantages can be achieved with all the aforedescribed process steps regarding the guidance of the arc in the area close to the workpiece, i.e. in the area where metal vapor or a laser-induced plasma, develop. It is sometimes possible to round the projecting edge of the thicker workpiece, without shading the basically vertical laser beam.

The latter applies particularly also to the trailing electrode, whose arc is guided behind the electrode on a comparatively sharply projecting edge of the thicker workpiece in the process range of the laser beam, whereby due to the additionally formed melt it is also possible to achieve a homogeneous transition between the two upper surfaces of the welded workpieces. An increase in speed results especially in the welding of thinner sheet metal pieces, where heat elimination from the welding zone is comparatively low.

The process of the invention can be carried out so that two sheet metal pieces are used as workpieces and one of the workpieces is arranged with its edge surface at an angle with respect to a side surface of the other sheet metal piece and the arc is basically guided by the edge of the one sheet metal piece. This special arrangement of the two sheet metal pieces makes it possible to perform the hybrid welding consisting of the combined laser beam welding and arc welding also in the case of conventional parts with edge guidance, in order to achieve a correspondingly secure weld.

The process can be carried out so that two galvanized sheet metal pieces are used as workpieces, one of which is positioned at an angle with respect to the lateral surface of the other sheet metal piece in the area of the weld seam. As a result the edge surface of the so positioned sheet metal piece forms an acute angle with the neighboring lateral surface of the other sheet metal piece and the lateral surface of the sheet metal piece set at an angle forms also an acute angle with the lateral surface of the other sheet metal piece. The zinc in the weld seam area can evaporate due to the advancing welding heat, so that the melt provides a sufficient weld connection.

The process can be further developed advantageously by using two sheet metal pieces as workpieces, whose edge surfaces form the angular surfaces and two edges of the weld area, on which the arc is guided. The sheet metal pieces or their edge areas are set at such an angle with respect to each other that the edge guidance of the arc can be achieved. This process can also be carried out with galvanized sheet metal pieces, since the zinc can evaporate to both sides of the sheet metal pieces, without hindrance. The aforedescribed use of the two sheet metal pieces is advantageous particularly when they have the same thickness.

The aforedescribed processes are of special importance for use in the construction of auto body parts. The process can be performed advantageously in the production of hollow metal sheet supports.

The process can be performed so that, in addition to an electrode preceding the laser beam, at the same time also an electrode trailing the laser beam is used. With the arc of the forerunning electrode the projecting edge is melted off in the sense of being rounded, and that the arc of the trailing electrode is guided with it into the vapor capillaries of the laser beam.

In this process two electrodes are simultaneously used, each performing a different task. With the arc of the forerunning electrode the projecting edge of the thicker workpiece is melted off in the sense of a rounding. This melting off provides a homogeneous levelling at the weld seam area and supplies material to a possible gap. Through the arc of the trailing electrode energy is supplied to the welding area, and particularly into the vapor capillaries formed by the laser beam, when the arc with the trailing electrode is correspondingly guided. A considerable speed increase can be reached. But it is also possible to achieve a deep welding process which can attain a bigger welding depth at the same welding speed, in order to weld together thicker workpieces.

It is particularly advantageous to perform the process so that an arc ignition of one or several electrodes takes place with intensity-modulated and/or pulsed laser beam, so that the arc extinguishes itself after its ignition or its electrode voltage is lowered below the ignition voltage and so that after that a new arc ignition takes place. As a result of the intensity modulation and/or of the pulsing of the laser beam in certain cases, by influencing the arc, it can be achieved that the arc can not burn without interruption or that it is extended when the burning is interrupted. It burns forcibly only where the laser beam falls on the surface of the workpiece and provides preliminary ionization. Corresponding to this preliminary ionization, there is a path of minimum resistance from electrode to the surface of the workpiece, which is sought out by the arc. Since the preliminary ionization is the most intense in the area of the vapor capillaries, the arc will supply additional thermal energy precisely to the processing location of the workpiece.

In order to achieve that the arc produced behind the laser beam is only slightly deflected sideways, in some cases in spite of the edge of the thicker workpiece already rounded by the forerunning arc, and as a result follows only partially the preliminary ionization of the welding area, the process is performed so that the trailing electrode is guided outside out of the laser beam trajectory at a distance from the rounded edge of the thicker workpiece. In this way the edge of the thicker workpiece is no longer able to deflect the arc from the vapor capillaries, due to a corresponding development of the electric field.

When the laser beam is focussed more strongly than the width of a gap formed between the workpieces, it is possible to use a laser beam of higher intensity, thereby reaching higher speeds. Although it is possible to achieve higher intensities through stronger focussing also in a process without the use of an additional arc, thereby also increasing welding speed, the seam would narrow down so much that the smallest defects in the edge preparation would have extremely negative effects and it would not be really possible to obtain a reasonable weld seam geometry. Small gaps between the workpieces would already be completely traversed by a stronger focussed laser beam, without the possibility to join the two workpieces.

BRIEF DESCRIPTION OF THE DRAWING

The above and other objects, features, and advantages will become more readily apparent from the following description, reference being made to the accompanying drawing in which:

FIGS. 4A and 4B are two sectional views through the weld seam area of two tailored blanks welded to each other by means of traditional laser beam welding and of welding with combined laser beam/arc process, the so-called hybrid welding;

FIG. 6 is a sectional view through the weld seam area in the case of combined laser beam/arc welding;

FIG. 8 is a perspective view of a hollow sheet metal support with two different seam formation; and FIGS. 8A and 8B are sectional views of the details VIIIA and VIIIB of FIG. 8.

SPECIFIC DESCRIPTION

Figure 1:
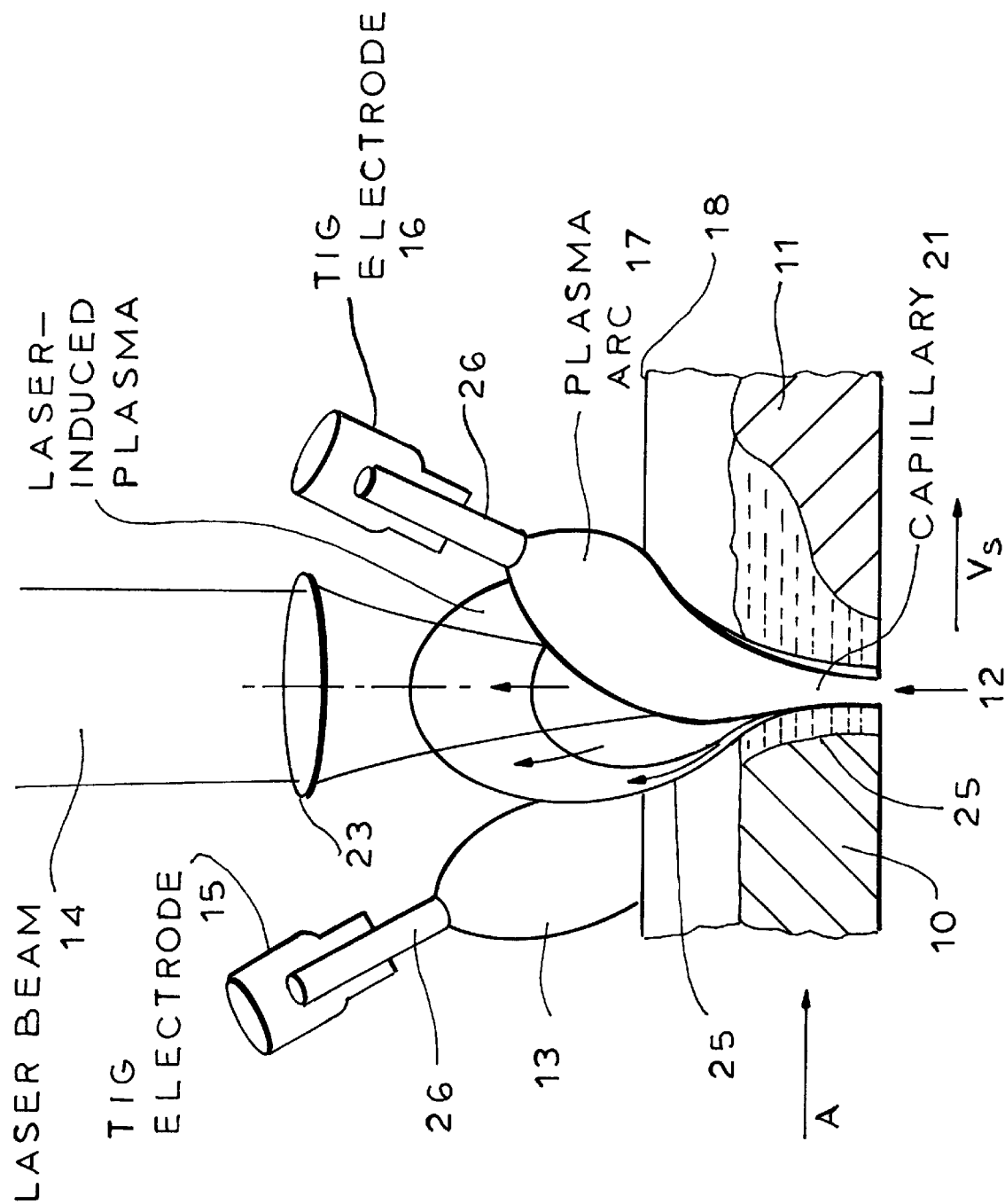
FIG. 1 is a schematic section through a device for welding tailored blanks with the aid of laser radiation and an arc.
Figure 2:
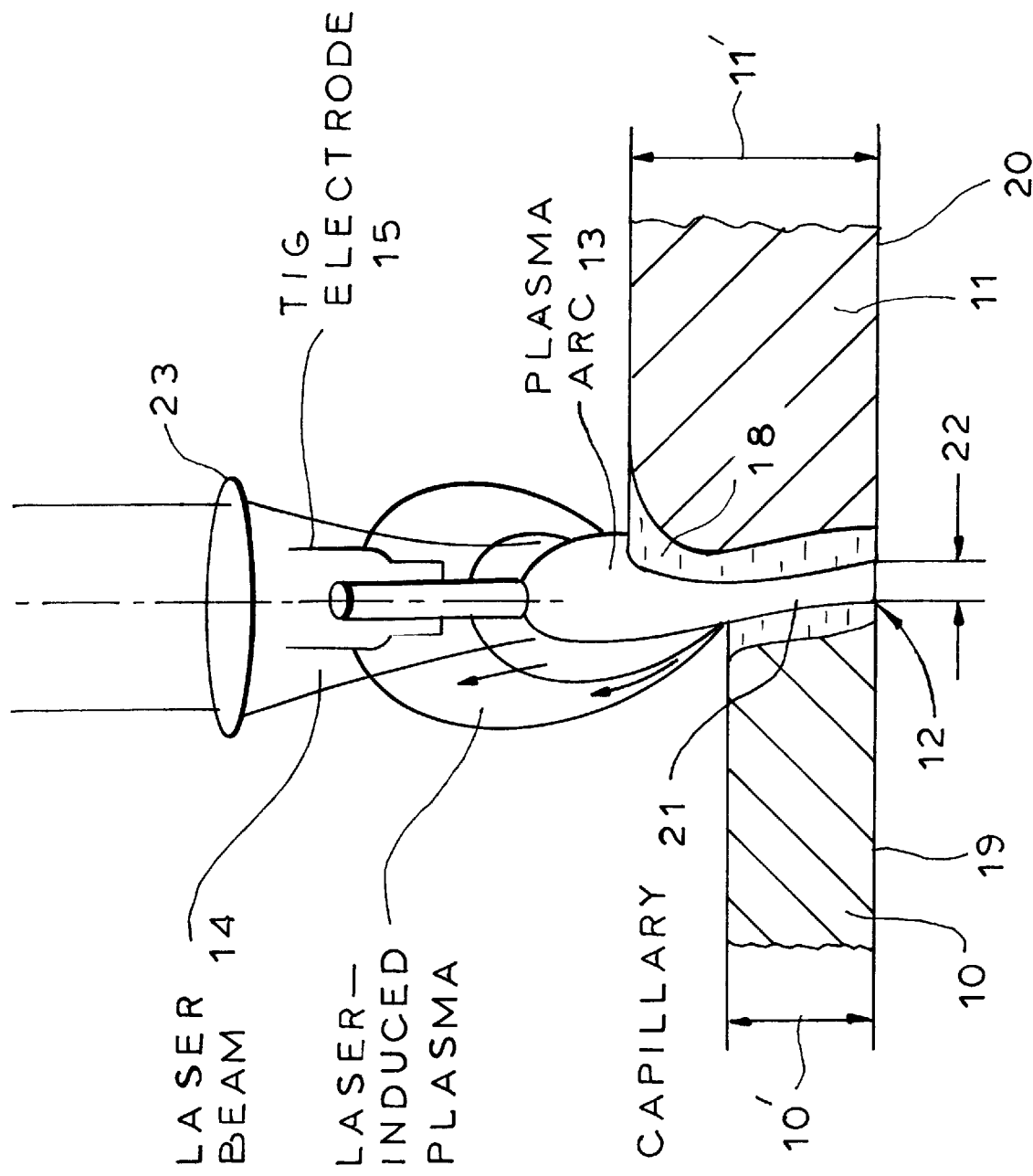
FIG. 2 is a schematic representation of the device in FIG. 1 in the direction A.

FIGS. 1 and 2 show two workpieces 10, 11 whose lower sides 19, 20 are in the same plane, i.e. aligned with each other. The workpieces 10, 11 have different thicknesses 10', 11', so that the workpiece 11 projects vertically. In the arrangement visible especially in FIG. 2 in the form of a butt joint, a seam area 12 is created, over which an edge 18 of the thicker workpiece projects vertically.

The optical system of the laser beam welding process for welding together the workpieces 10, 11 is symbolized only by a focussing lens 23. With this focussing lens 23 a laser beam 14 is focussed on the seam area 12. It is obvious that thereby the projecting edge 18 is an obstacle, namely it shades a portion of the laser beam.

With the aid of the laser radiation of the laser beam 14 material is evaporated in the seam area 12, wherein the workpieces 10, 11 are positioned close to each other, or in the case of a bad seam preparation or positioning tolerances form a gap 22. In this way the schematically represented laser-induced plasma is generated, i.e. ionized material in gas form or vapor form which follows the indicated arrows away from the seam area 12. The resulting vapor capillary 21 is a hollow space filled with metal vapor, limited on both parts by the melt 24, whereby this material is melted as a result of the coupling of the laser radiation energy to the metal. In the FIG. 1 $v_s$ is the relative advance speed of the workpieces 10, 11, whereby the melt behind the vapor capillary 21, due to the heating and the time required for solidification, has a larger volume than the comparatively thin melt film between the capillaries 21 and the solid melt front 25.

In FIG. 1 two electrodes 15, 16 are shown. Both electrodes 15, 16 are TIG (tungsten inert gas) electrodes, which means that they consist of an electrode rod 26 made of tungsten which is used in connection with an inert gas. When there is a suitable electrode potential difference, an arc 13 or 17 is formed between the electrode body 26 and the workpieces 10, 11 constituting a counter electrode. All electrodes are arranged at an angle with respect to the process area close to the workpiece.

From FIG. 1 it can be seen that the electrode 15 precedes the laser beam 14, and so does the respective arc 13. According to FIG. 2 the arc 13 is footed on the edge 18 of the thicker workpiece 11. Here it causes a melting of the material of this edge 18, which can flow into the seam are 12. The melt flows into a gap possibly located here or collects so that a rounding of the edge area between the thinner workpiece 10 and the vertical surface of the thicker workpiece 11 takes place. This is evident from the comparison of the two representations of FIGS. 4A and 4B. In this FIG. 4A the seam area of two tailored blanks is shown. These blanks have been welded together in the conventional manner by laser beam. It can be seen that a considerable seam collapse has to be expected at the workpiece upper side, as well as on the workpiece underside of the workpieces 10, 11. Also a warping occurs in the area 12 diminishing the quality of the weld seam, as can be seen from the nonvertical free lateral surface below the edge 18 of the thicker workpiece 11. By comparison, the seam area 12 resulted from the welding of the workpieces 10, 11 when in addition to the laser beam also an arc is used, is strongly flattened. A notch effect damaging the strength of the weld due to collapse need not be feared.

Besides the forerunning electrode 15, FIG. 1 shows also a trailing electrode 16, whose arc 17 however is not footed on the edge 18 of the thicker workpiece 11. Furthermore the arc 17 starting from the electrode rod 26 is guided into the vapor capillaries 21 of the laser beam 14, which basically takes place also through the preliminary ionization caused by the laser beam, so that the plasma 17 of the electrode 16, as a result of the laser-induced plasma runs towards the laser beam 14 approximately in a straight line until it reaches the opening of the vapor capillaries 21 and then runs into the latter. In this way a complete welding over the entire height of the workpiece can be achieved.

Figure 3:
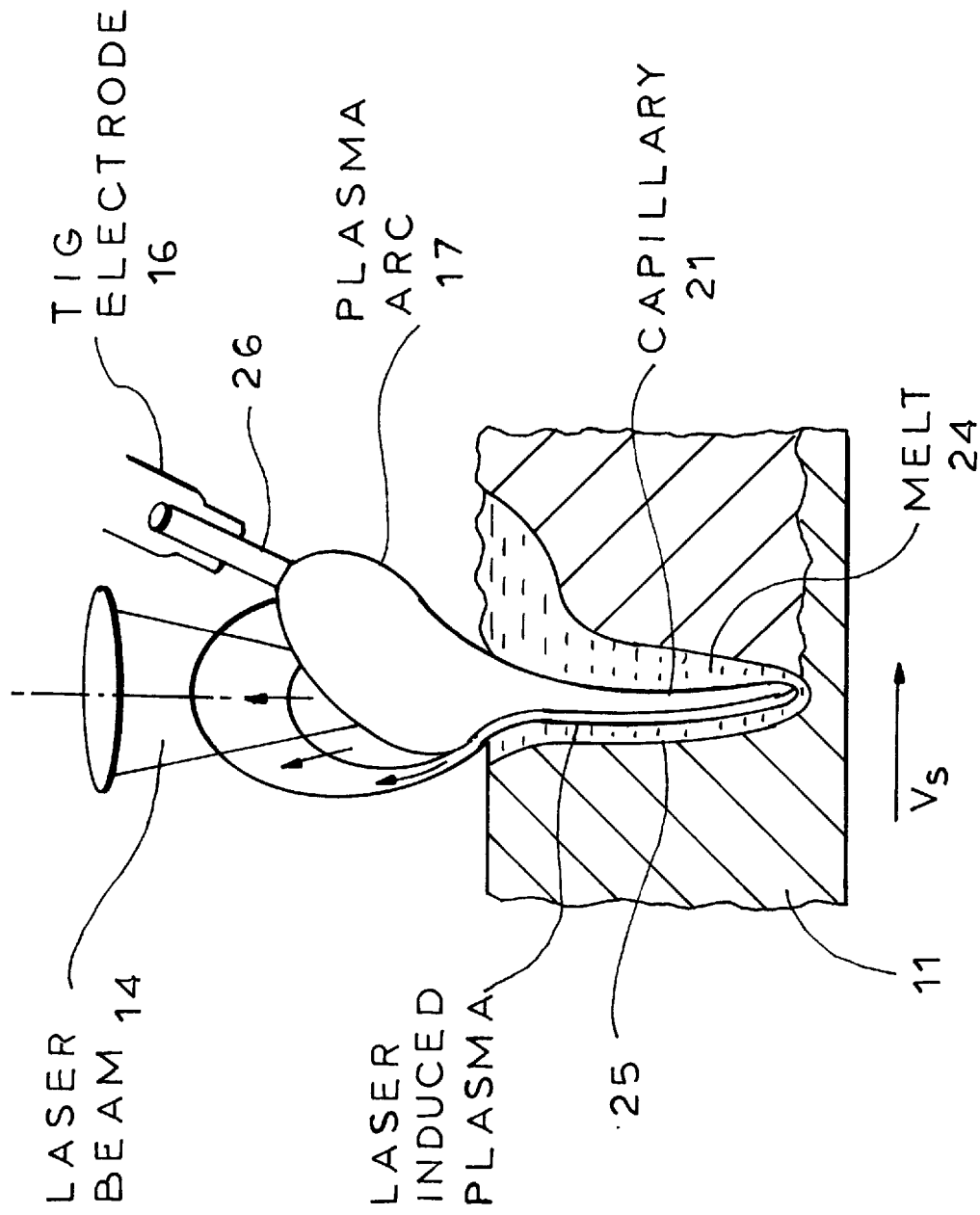
FIG. 3 is a section similar to that of FIG. 1 for explaining the effect of deep welding.

FIG. 3 shows how the guidance of the plasma 17 by the laser-induced plasma into the vapor capillaries 21 can be used for creating a deep welding effect, whereby the energy coupled in through the plasma of the arc 17 can advance deep into the vapor capillaries 21, thereby being coupled into the walls of the vapor capillaries. Steps which are advantageous for the guidance of the arc are described in detail in the German Patent document 43 34 568, reference being made hereby to the entire content of its disclosure. In particular an arc ignition of the trailing electrode 16 takes place with intensity-modulated and/or pulsed laser radiation. After its ignition the arc 17 can either self-extinguish or its electrode potential is lowered under its ignition voltage, thereby causing the extinction. Subsequently with the modulated increasing electrode voltage or a new pulsing, a new arc ignition occurs from the electrode body 26 into the preionized area of the laser-induced plasma.

Figure 5:
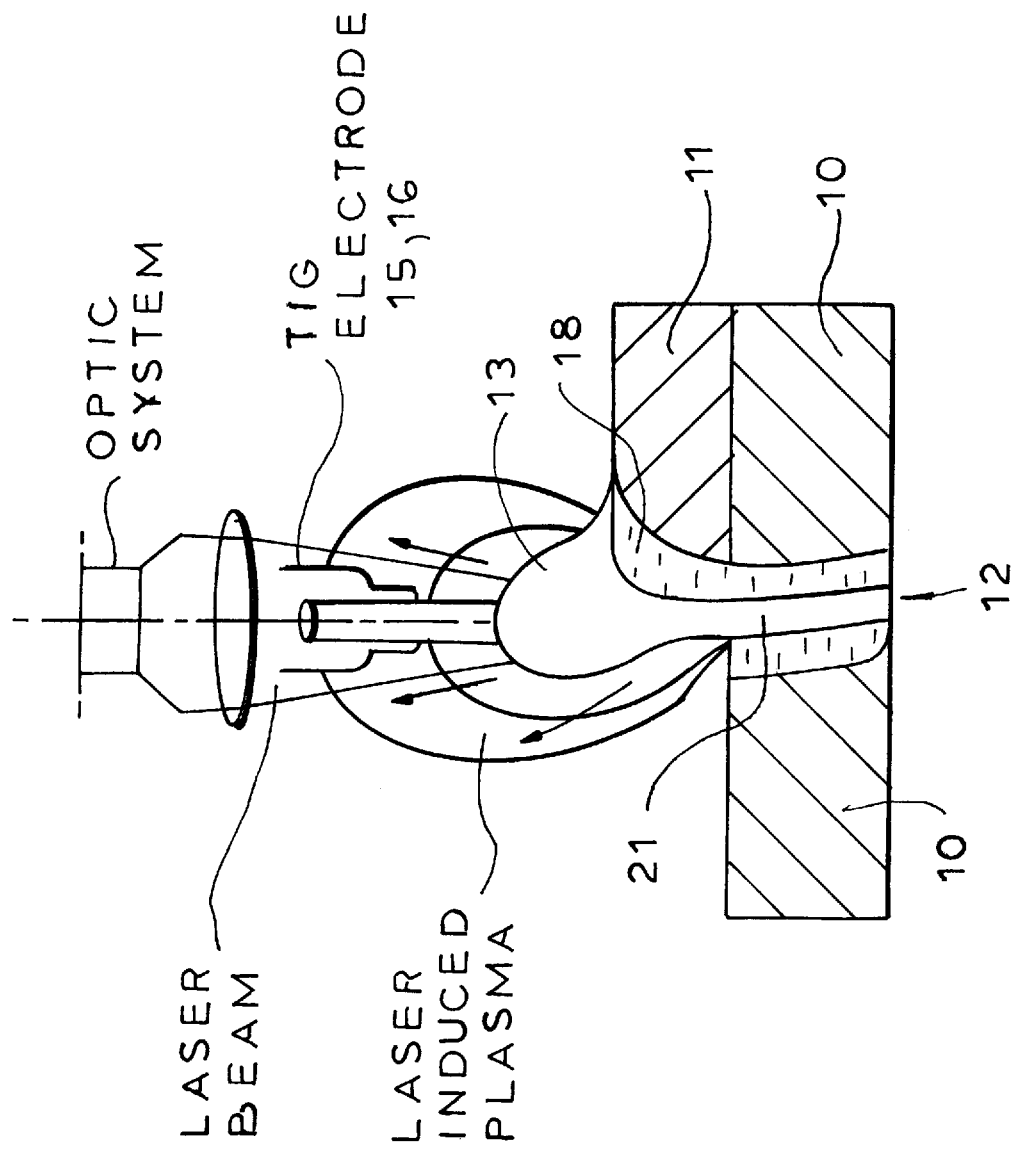
FIG. 5 is a vertical section similar to FIG. 2 for welding two workpieces, namely two adjacent and parallel sheet metal pieces.

FIG. 5, similar to FIG. 2, is provided with the same reference numerals for similar components. To this extent reference is made to the description of FIG. 2. Departing from FIG. 2, in FIG. 5 two sheet metal pieces are shown, whose arrangement corresponds to the arrangement in FIG. 7b. It can be seen from FIG. 5 that the arc 13 starting out from the TIG electrode 15 is footed on the edge 18 of the workpiece 11 and causes here a melting of the material, which then can flow into the seam area 12. The further marking of the electrodes with 16 expresses the fact that the process according to FIG. 5 can also be carried out with trailing electrodes or electrodes guided laterally along the weld seam, as was described in FIG. 1. As the melt flows into the seam area 12, a seam according to FIG. 6 is created, when according to FIG. 2 two equally thick workpieces 10, 11 are welded with a small gap 27 between them, namely with a hybrid process with Nd:YAG laser and TIG electrodes. The melting off of the edge 18 leads to the comparatively flat front in the seam area 12 which is evident, whereby there was no throughwelding, differing from the schematic representation of FIG. 5. If the workpiece 11 were thicker, for instance three times as thick as the workpiece 10, a steeper seam front would result, because the melting of the edge 18 could be comparatively reduced.

Figure 7A:
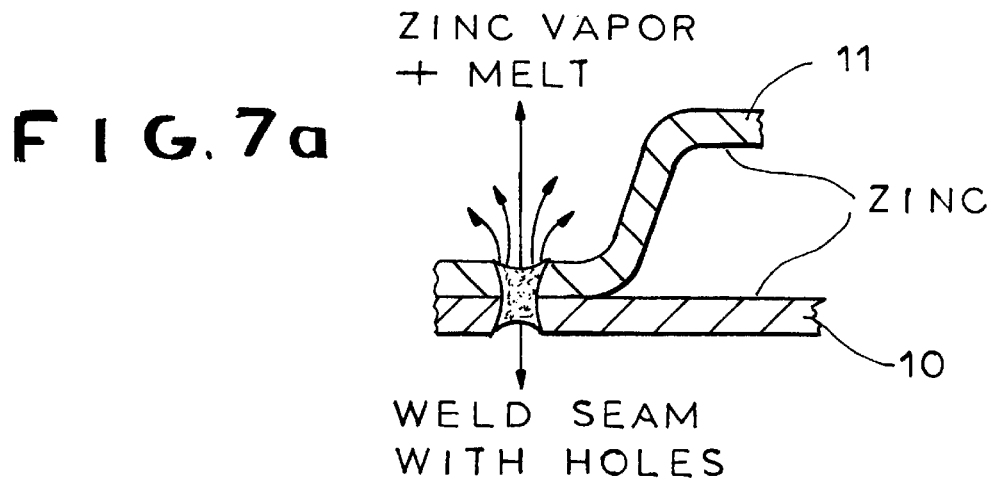
FIGS. 7a to 7g schematic representations similar to each other of workpieces ready for welding or welded, shown in section.
Figure 7B:
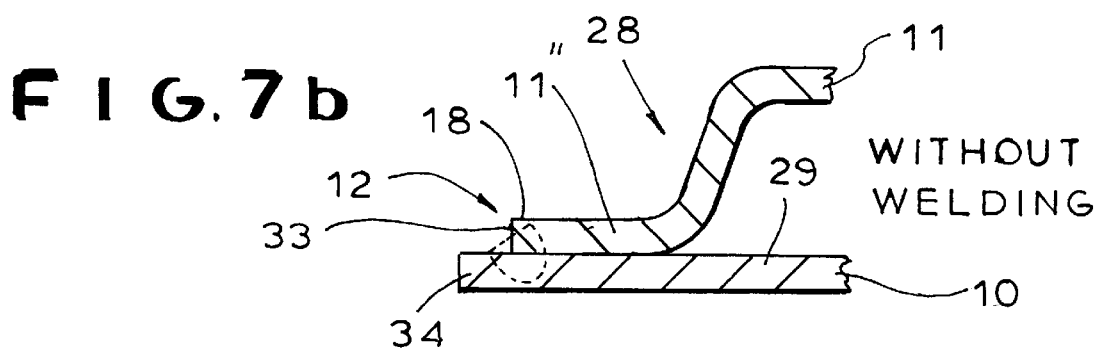

FIG. 7b shows the schematic arrangement of workpieces 10, 11 in the seam area 12 prior to welding. The workpiece 11 designed as a sheet metal piece is provided in the edge area 12 with a bend 28, so that the bent sheet rim 11" can become adjacent to the neighboring lateral surface 29 of the workpiece 10, also designed as a sheet metal piece. During hybrid welding the seam areas indicated in broken lines in FIG. 7b and the edge 18 are melted, so that generally the weld seam cross section 30 shown in FIG. 7c results. The seam front 31 is slanted and inclined at approximately 45 degrees.

Figure 7C:
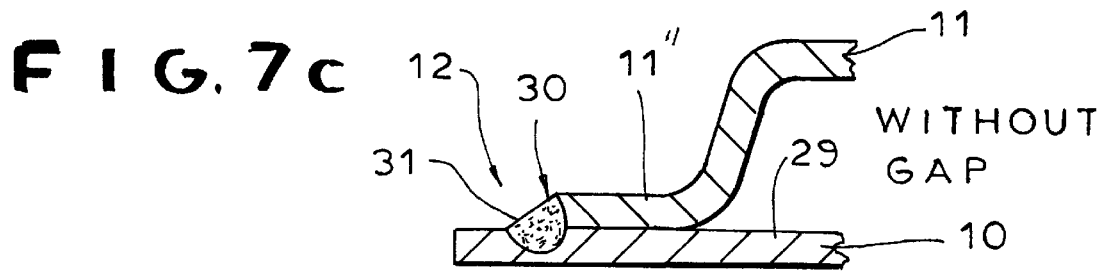
Figure 7D:
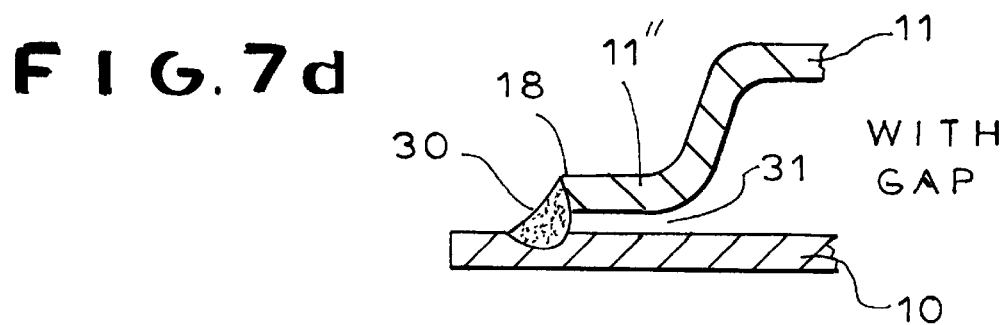

If the workpiece 11 with its sheet rim 11" is separated from the workpiece 10 by a gap 32, according to FIG. 7d, then the welding on of the edge 18 by means of the arc of electrode 15 according to FIG. 5, is also possible, whereby a somewhat bigger weld seam cross section 30 results, possible with a slight seam collapse due to the gap 32. In this setup the edge surface 33 of the workpiece 11 is arranged at an acute angle with respect to the lateral surface 29 of the workpiece 10.

Problems arise especially in the overlapping welding of galvanized sheets especially in the field of autobody construction and in the construction of motor vehicles. The cause is the low vaporization temperature of the zinc. Evaporating zinc leads to melt ejections as a result of the generated high vapor pressure. FIG. 7a shows workpieces 10, 11 which are galvanized sheets, lying overlappingly next to each other in the welding zone. The conventional welding, as well as the hybrid welding, leads to a defective weld seam, whereby the defects appear for instance as holes, because the melt was ejected by the zinc vapor. It is commonly known to arrange the workpieces with a defined gap between them. The gap gives the zinc the possibility to evaporate, without impairing the weld seam. However if the gap is too big, e.g. bigger than 0.5 mm, then even during hybrid welding the missing melt volume can not be compensated by the larger total melt bath.

In order to make possible a perfect welding of galvanized sheets in the hybrid welding process, the process represented in FIGS. 7b to 7d is modified. What is preserved is the shortening or narrowing of the sheet rim 11" with respect to the workpiece 10, whose lower edge 34 project with respect to the edge surface 33. Consequently in an arrangement according to FIG. 7b a right angle is obtained between the edge surface 33 and the lateral surface 29.

Figure 7E:
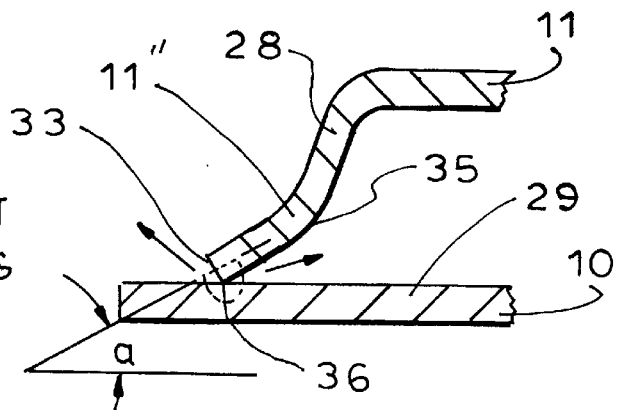

Deviating from FIG. 7b, according to FIG. 7e the workpiece 11 is arranged with the sheet rim 11" angled with respect to the workpiece 10, respectively to its lateral surface 29. The angle α is for instance 35 degrees. The bend 28 is comparatively open. The edge surface 33 forms with the lateral surface 29 an acute angle, as does the lateral surface 35 of the sheet rim 11". The edge 36 of workpiece 11 which is close to the workpiece 10 lies against the lateral surface 29, so that seen over the length a line contact is established. The seam cross section to be melted is indicated in broken lines in FIG. 7e.

Figure 7F:
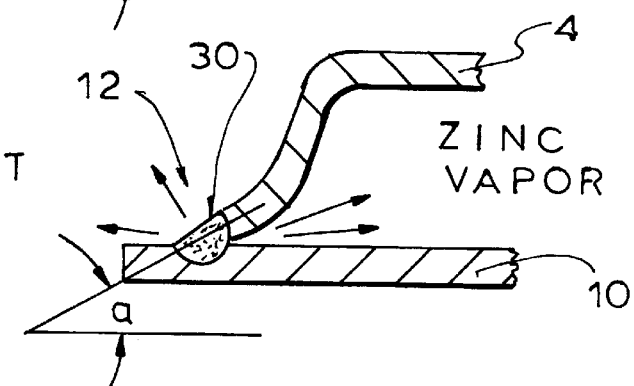
Figure 7G:
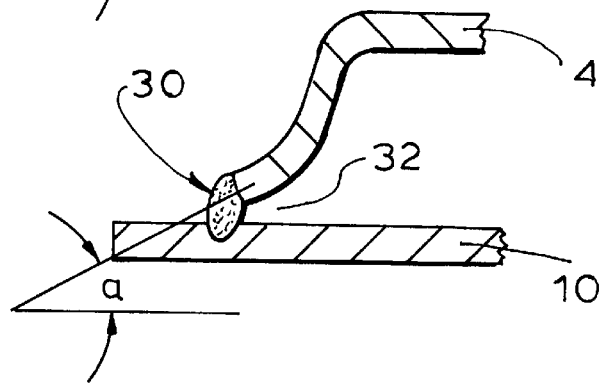

In the welding configuration shown in FIG. 7e the zinc vapor can escape from the seam area 12, as shown by the arrows in FIGS. 7e and 7f. During welding a perfect seam without holes results with seam cross section 30. In FIG. 7g the workpiece 11 is at a somewhat greater distance from the workpiece 10 than in FIG. 7f. In this way a gap 32 is formed, which allows for an even better escape of the zinc vapor. The seam cross section 30 is slightly different from the one in FIG. 7f, determined by a changed melt flow away from the edge 18 or the edge surface 33 of the workpiece 11. However a sufficient connection strength can be obtained even with the existing gap 32.

In FIG. 8 a hollow sheet metal support 36 is shown, basically a pipe, which is to be produced from the two workpieces 10 and 11 built as half-shells. In the area of the left seam of the hollow sheet metal support 36 the workpiece 11 is provided with a bend 28 projecting towards the inside of the support, which together with the rim 37 of the workpiece 10 forms a lap joint. An edge surface 33 of the rim 37 is arranged at an angle to the bend 28, respectively the workpiece 10, so that with the aid of the edge 18 of the rim 37 a guidance of the arc 13, 17 can be achieved during welding, whereby a weld seam shown in the detail of FIG. 8A is produced with an approximately teardrop-shaped cross section 30.

The right seam (FIG. 8B) of the hollow sheet metal support 36 of FIG. 8 shows rims 38, 39 of the workpieces 10, 11, which are angled towards the outside, so that their edge surfaces 40, 41 are not parallel or border each other so as to form an obtuse angle, as a result of which two edges 18 are formed by means of which the arc 13, 17 can be guided during welding. During welding the edges 18 and the rims 38, 39 of the workpieces 10, 11 are melted so that the seam cross section 30 shown in the FIG. 8B results, and consequently the entire seam area of the finished hollow sheet metal support 36 has an approximately uniform cross section. In this case also bigger gaps can be bridged, since there is sufficient melt available due to the angled sheets.

The aforedescribed fillet welding seam, especially for sheets, has the advantage of a seam formation without defects in the case of galvanized sheets. Furthermore an obvious advantage appears to be the fact that the positioning accuracy of the workpieces can be reduced. It does not have to be insured that the gap between the two workpieces to be welded need not be held below a predetermined width of for instance 0.5 mm. Further the aforedescribed welding process makes it possible to save material with a skilled construction. For instance in the conventional production of hollow sheet metal supports, half-shells with a hat-shaped cross section are used, whose rims are connected by spot welding and for this purpose have to have a rim width of up to 15 mm. Also in the conventional welding by laser beam of such hat-shaped half-shells a quite considerable rim width of approximately 5 mm is required. By comparison it can be seen from FIG. 8 that the bend 28, respectively the angling of the rims 38, 39 result in reduced additional consumption of material for the production of the seam. The hollow sheet metal support 36 can be produced at smaller cross sections with up to 80% less material consumption due to eliminated rims in the case of hat-shaped profile cross sections.

It is essential for the invention that the arc 13, 17 guided on an edge 18 of the workpieces 10, 11 be stabilized by the laser-induced vaporization of the material.

We claim:

1. A welding process comprising the steps of:
   (a) juxtaposing two sheet-metal workpieces to form a seam area along and above which a sharp edge of one of said workpieces projects;
   (b) training a vaporizing laser beam onto said seam area to vaporize material from at least one of said workpieces and form a vapor column above a melt of metal from said workpieces;
   (c) advancing said laser beam along said seam area to form a seam between said workpieces upon solidification of said melt; and
   (d) in a region of said vapor column maintaining at least one welding arc between an electrode and said seam area advancing relative to said workpieces with said laser beam and guided on said edge, whereby said at least one welding arc melts said sharp edge and contributes to formation of said melt.

2. The welding process defined in claim 1 wherein said workpieces are of different thicknesses and are disposed in a butt joint with aligned undersides, said edge being an edge of a thicker one of said workpieces projecting above the other of said workpieces.

3. The welding process defined in claim 2 wherein, in the step (d), the welding arc is provided ahead of said laser beam, a welding arc is provided to trail said laser beam or an arc is provided outside a trajectory of said laser beam and laterally thereof, said arc being angled outwardly from said other workpiece.

4. The welding process defined in claim 1 wherein said one of said workpieces is juxtaposed with a surface of the other of said workpieces and said edge is inclined to said surface.

5. The welding process defined in claim 1 wherein said sheet-metal workpieces are galvanized sheets and said edge of one of said workpieces is inclined to a surface of the other workpiece in said seam area.

6. The welding process defined in claim 1 wherein said sheet-metal workpieces are juxtaposed so that edges of said workpieces are inclined to one another in said seam area.

7. The welding process defined in claim 1 wherein a welding arc is provided ahead of said laser beam in a direction of advance of said laser beam along said seam.

8. The welding process defined in claim 7 wherein a trailing arc is provided behind said laser beam and is guided into said vapor column.

9. The welding process defined in claim 8 wherein arc ignition is effected repeatedly with arc extinction between ignitions.

10. The welding process defined in claim 8 wherein the arc ignition is effected by intensity modulated laser radiation.

11. The welding process defined in claim 9 wherein the arc ignition is effected by pulsed laser radiation.

12. The welding process defined in claim 9 wherein said trailing arc is guided outside a trajectory of the laser beam at a distance from a rounded edge formed by melting of said sharp edge.

13. The welding process defined in claim 8, further comprising the step of increasing the focus of said laser beam on said area with increasing gap width between said workpieces.

* * * * *